US010489977B2

(12) United States Patent
Ghorbal et al.

(10) Patent No.: US 10,489,977 B2
(45) Date of Patent: Nov. 26, 2019

(54) METHOD FOR ESTABLISHING A DEFORMABLE 3D MODEL OF AN ELEMENT, AND ASSOCIATED SYSTEM

(71) Applicant: Mimi Hearing Technologies GmbH, Berlin (DE)

(72) Inventors: Slim Ghorbal, Rennes (FR); Renaud Seguier, Acigne (FR); Xavier Bonjour, Le Port Marly (FR)

(73) Assignee: Mimi-Hearing Technologies GmbH, Berlin (DE)

( * ) Notice: Subject to any disclaimer, the term of this patent is extended or adjusted under 35 U.S.C. 154(b) by 0 days.

(21) Appl. No.: 16/300,044

(22) PCT Filed: May 15, 2017

(86) PCT No.: PCT/EP2017/061607
§ 371 (c)(1),
(2) Date: Nov. 8, 2018

(87) PCT Pub. No.: WO2017/202634
PCT Pub. Date: Nov. 30, 2017

(65) Prior Publication Data
US 2019/0147650 A1    May 16, 2019

(30) Foreign Application Priority Data
May 27, 2016 (FR) .................... 16 54765

(51) Int. Cl.
*G06T 17/20* (2006.01)
*G06T 19/00* (2011.01)

(52) U.S. Cl.
CPC ............ *G06T 17/205* (2013.01); *G06T 17/20* (2013.01); *G06T 19/00* (2013.01); *G06T 2207/20116* (2013.01); *G06T 2210/44* (2013.01); *G06T 2219/021* (2013.01)

(58) Field of Classification Search
None
See application file for complete search history.

(56) References Cited

U.S. PATENT DOCUMENTS

| | | | | |
|---|---|---|---|---|
| 2007/0031028 | A1* | 2/2007 | Vetter | G06K 9/00208 382/154 |
| 2017/0154461 | A1* | 6/2017 | Rhee | G06T 15/04 |
| 2018/0130324 | A1* | 5/2018 | Yu | G06K 9/00241 |
| 2019/0087972 | A1* | 3/2019 | Huttunen | G06K 9/00201 |

OTHER PUBLICATIONS

Manolova, et al., "Study of two 3D face representation algorithms using range image and curvature-based representations", International Journal of Computing, vol. 13 (1), pp. 42-49, Jan. 1, 2014.
Albrecht, et al., "Deformable Models", pp. 1-12, Jun. 1, 2010.

* cited by examiner

*Primary Examiner* — Frank S Chen
(74) *Attorney, Agent, or Firm* — Polsinelli

(57) ABSTRACT

A method is provided for generating a three-dimensional morphable model of an element from an initial database of examples of such elements providing data allowing, for each of the elements of the initial database, a three-dimensional meshed surface based on points and on a triangular network connecting the points to be determined.

12 Claims, 12 Drawing Sheets

METHOD FOR ESTABLISHING A DEFORMABLE 3D MODEL OF AN ELEMENT, AND ASSOCIATED SYSTEM

CROSS-REFERENCE TO RELATED APPLICATIONS

This application is a National Stage of International patent application PCT/EP2017/061607, filed on May 15, 2017, which claims priority to foreign French patent application No. FR 1654765, filed on May 27, 2016, the disclosures of which are incorporated by reference in their entirety.

FIELD OF THE INVENTION

The present invention relates to a method and system a for generating a three-dimensional morphable model of an element.

BACKGROUND

Introduced for the first time by Blanz & Vetter in 1999 ("A morphable model for the synthesis of 3d faces" by Volker Blanz and Thomas Vetter, in Proceedings of the 26th Annual Conference on Computer Graphics and Interactive Techniques, SIGGRAPH '99, pages 187-194, New York, N.Y., USA, 1999, ACM Press/Addison-Wesley Publishing Co.), morphable models have since not ceased to increase in popularity.

These morphable models are used both in three-dimensional or 3D animation ("Mpeg-4 compatible 3D facial animation based on morphable model" by Bao-Cai Yin, Cheng-Zhang Wang, Qin Shi, and Yan-Feng Sun, in Machine Learning and Cybernetics, 2005, Proceedings of 2005 International Conference on, volume 8, pages 4936-4941 Vol. 8, August 2005; and "Statistical generation of 3D facial animation models" by Rudomin, A. Bojorquez, and H. Cuevas, in Shape Modeling International, 2002, Proceedings, pages 219-226, 2002.) and for the purposes of identity verification or recognition ("Face recognition based on fitting a 3D morphable model" by Volker Blanz and Thomas Vetter, Pattern Analysis and Machine Intelligence, IEEE Transactions on, 25(9):1063-1074, 2003; "Automatic 3D face verification from range data" by Gang Pan, Zhaohui Wu, and Yunhe Pan in Acoustics, Speech, and Signal Processing, 2003, Proceedings. (ICASSP '03). 2003 IEEE International Conference on, volume 3, pages 111-193-6 vol. 3, April 2003; "Audio- and Video-Based Biometric Person Authentication" by Alexander M. Bronstein, Michael M. Bronstein, and Ron Kimmel, $4^{th}$ International Conference, AVBPA 2003 Guildford, UK, Jun. 9-11, 2003 Proceedings, chapter Expression-Invariant 3D Face Recognition, pages 62-70, Springer Berlin Heidelberg, Berlin, Heidelberg 2003; "3d shape-based face recognition using automatically registered facial surfaces" by M. O. Irfanoglu, B. Gokberk, and L. Akarun, in Pattern Recognition, 2004, ICPR 2004, Proceedings of the 17th International Conference on, volume 4, pages 183-186 Vol. 4, August 2004.

Initially applied to the modeling of faces, these models have gradually been transposed to many other elements such as ears ("A novel 3D ear reconstruction method using a single image" by Chen Li, Zhichun Mu, Feng Zhang, and Shuai Wang, in Intelligent Control and Automation (WCICA), 2012 $10^{th}$ World Congress on, pages 4891-4896, IEEE, 2012; "3D morphable model construction for robust ear and face recognition" by John D Bustard and Mark S Nixon, in Computer Vision and Pattern Recognition (CVPR), 2010 IEEE Conference on, pages 2582-2589. IEEE, 2010.), the human body in its entirety ("The space of human body shapes: reconstruction and parameterization from range scans" by Brett Allen, Brian Curless, and Zoran Popovic, in ACM transactions on graphics (TOG), volume 22, pages 587-594. ACM, 2003.) or even to animal skeletons ("Morphable model of quadrupeds skeletons for animating 3D animals" by Lionel Reveret, Laurent Favreau, Christine Depraz, and Marie-Paule Cani, in Proceedings of the 2005 ACM SIGGRAPH/Eurographics Symposium on Computer Animation, SCA '05, pages 135-142, New York, N.Y., USA, 2005. ACM.).

Nevertheless, whatever the studied subjects, the steps of construction remain substantially identical, namely:
1) Acquisition of 3D data serving as statistical training examples.
2) Dense registration of said training examples.
3) Creation of a vector space specific to the studied subject using a statistical analysis method such as principal component analysis (PCA), independent component analysis (ICA) or derivatives thereof.

The last step of this process, step 3), in particular gives rise to what is called an average vector and to deformation modes the linear combinations of which subsequently allow not only the training examples to be reformed but also new elements (new faces in the case of a morphable model of faces for example) to be generated.

However, despite the apparent simplicity of such a method, its application must solve two major problems: that of determining which points can be registered in each training example and that of carrying out this association on a sufficient number of points (conventionally several thousand).

To this end, Blanz and Vetter have proposed to use an optical flow algorithm ("Hierarchical motion-based frame rate conversion" by James R Bergen and R Hingorani, Technical report, David Sarno Research Center, 1990).

At this stage, it will be noted that the laser used for the scanning-acquisitions delivered a cylindrical representation (also called a 2.5D representation). Thus, a two-dimensional or 2D image of the texture was immediately available and capitalized upon to implement the aforementioned algorithm.

However, in addition to being very sensitive to its initialization, this algorithm requires the deformations from one example to the next to be small (in the manner of successive images of a video), there being no reason for this to be so in the general case. Moreover, cylindrical representations have the major drawback of generating occlusions. Although the latter are relatively rare in the case of faces, making the method of Blanz and Vetter usable, the same does not apply in the case of more complex shapes, such as those of ears, for which the loss of information may prove to be unacceptable.

Chen Li et al. for their part took advantage of the particular shape of the subject studied thereby, namely the ear, and of position data, namely a photo and a depth map of the ear seen in profile, to construct a triangle mesh hierarchical growth algorithm ("A novel 3D ear reconstruction method using a single image" by Chen Li, Zhichun Mu, Feng Zhang, and Shuai Wang, in Intelligent Control and Automation (WCICA), 2012 10th World Congress on, pages 4891-4896, IEEE, 2012). A depth map, also called a 2.5D image or "z map", is a pixel-based image of z-coordinates that is in general created using a 3D camera. The grayscale levels in the depth map represent height values.

Contour detection was carried out on the photo and two initial markers were placed by the operator. The intersection of the perpendicular bisector of the segment connecting these two points with the exterior contour of the ear created a third point. By iterating this method with the new point and the preceding points, the authors created 17 points that were descriptive of the exterior contour of the ear. Via an analogous process, they also created other series of points that were descriptive of interior contours.

Next, a series of triangulations allowed them to obtain a deterministic segmentation of the ear into 23552 triangles and 13601 points. Assuming the still camera used to take the photo and 3D camera used to produce the depth map were positioned in the same location, 3D coordinates could be associated with the segmentation performed, thus achieving the registration.

Nevertheless, the very nature of the data makes the convolutions of the ear inaccessible and, in the end, does not allow a simplified model to be obtained, thus limiting the potential range of applications of this approach.

Furthermore, since the matching method is based on global and not local geometric considerations, such as the intersection of a straight line starting from one end of the image with a curve present at the other end, it causes dilution or even complete loss of the semantic information conveyed by the image.

Thus, characteristic points of the ear, such as the tragus or anti-tragus, cannot be reliably associated with one or more of the constructed descriptive points.

Lastly, such as mentioned by its authors, this method has the major drawback of giving correct results only for convex shapes, chaotic results in contrast being returned for simple star- or crescent-shaped geometries for example.

Kaneko et al. ("Ear shape modeling for 3D audio and acoustic virtual reality: The shapebased average hrtf" by Shoken Kaneko, Tsukasa Suenaga, Mai Fujiwara, Kazuya Kumehara, Futoshi Shirakihara, and SaSatoshi Sekine, Audio Engineering Society Conference: 61st International Conference: Audio for Games, Audio Engineering Society, 2016.) for their part used x-ray scans of molds of ears of volunteers and privileged the use of non-rigid 3D registration methods ("A new point matching algorithm for non-rigid registration" by Haili Chui and Anand Rangarajan, Computer Vision and Image Understanding, 89(2):114-141, 2003; "Robust point set registration using gaussian mixture models" by Bing Jian and Baba C Vemuri Pattern Analysis and Machine Intelligence, IEEE Transactions on, 33(8): 1633-1645, 2011.). The meshes consisted of about 3000 peaks and the deformation vectors transforming a reference mesh into the others of the database were sought using mixtures of Gaussians.

SUMMARY OF THE INVENTION

There is proposed, according to one aspect of the invention, a method for generating a three-dimensional morphable model of an element from an initial database of examples of such elements providing data allowing, for each of the elements of the initial database, a three-dimensional meshed surface based on points and on a triangular network connecting said points to be determined, wherein:

for each example element of the initial database, at each point of its meshed surface, the value of at least one parameter representative of the shape of the surface of the element at this point is determined (by measurement or computation) in order to obtain an improved database of example elements;

for each example element of the improved database, corresponding to the elements of the initial database, flattening is carried out on the three-dimensional meshed surface in order to obtain a two-dimensional representation of said meshed surface;

in all of the two-dimensional representations of the meshed surfaces of said elements, a plurality of respective points are brought into registration using said determined values of the one or more parameters representative of the shape of the surface of the element at said points and a method for analyzing said two-dimensional representations of the meshed surfaces;

on the basis of said registered points, said three-dimensional meshed surfaces of the initial database are down-sampled;

on the basis of the three-dimensional meshed surfaces of the initial database, a model of the element comprising an average shape of the element and deformation modes is determined; and said average shape of the element is re-meshed.

Thus, the invention is not dependent on the presence of texture information and may process sets of data that are devoid thereof, such as MRI results.

According to one implementation, said one or more parameters representative of the shape of the surface of the element at a point of the meshed surface of an example of the initial database comprise a local curvature at said point and/or a shape descriptor at said point.

Thus, it is possible to make the complexity of the one or more parameters that are representative of the shape of the surface of the element at a point on the surface vary depending on the requirements and/or external constraints.

In one implementation, said local curvature comprises a minimum curvature and/or a maximum curvature and/or a Gaussian curvature and/or an average curvature.

Thus, the choice of the type of curvature is a lever for adapting, depending on the requirements, the method to the particularities of the studied object.

According to one implementation, the shape descriptor comprises a surface patch histogram of index shape.

Thus, the method may be configured to detect the more or less marked presence of one or more types of shape rather than making do with a measurement of curvature.

For example, said flattening uses an ABF, LSCM, ABF++, or HLSCM method.

Thus, the method is not constrained to the use of one particular flattening method but may select such a method or such other method depending on the advantages obtained and the requirements of the moment.

According to one implementation, said registration uses a segmentation of the two-dimensional representations into $N_C$ curvature levels that are uniformly distributed over the range of the values taken by the values of the one or more parameters representative of the shape of the surface of the element.

Thus, the two-dimensional representations may be segmented according to objective and reproducible criteria.

As a variant, said registration uses a segmentation of the two-dimensional representations into $N_C$ curvature levels that takes into account the statistical distribution of the values taken by the values of the one or more parameters representative of the shape of the surface of the element.

Thus, it is possible to make the preceding variant independent of the presence of extreme values but also to take into account the over-representation or under-representation of certain ranges of values.

In one implementation, which said registration uses a number $N_S^{manu}$ of manually registered points.

Thus, the operator precisely controls the positioning thereof. This is particularly useful during the construction of small models (for testing purposes or through a lack of training examples).

For example, the method is semiautomatic, and, during said registration, the number $N_S^{manu}$ of points registered manually for the current element decreases with the number of processed elements.

Thus, the construction time of the model and its cost in human resources are made marginal during the addition of new examples.

As a variant, the method is automatic and based on snakes, the number $N_S^{manu}$ of points registered manually being zero.

Thus, the construction time of the model and its cost in human resources are minimized, making the optimization of the other construction parameters (parameters of computation of the curvature, number of points of the training examples, choice of the flattening algorithm, etc.) easier. The latter two variants are particularly advantageous in the context of large training databases.

In one implementation, said element is a right ear and/or a left ear, and/or the head, and/or the torso of an individual.

According to another aspect of the invention, a system is also proposed for generating a three-dimensional morphable model of an element from an initial database of examples of such elements providing data allowing, for each of the elements of the initial database, a three-dimensional meshed surface based on points and on a triangular network connecting said points to be determined, comprising a computer configured to implement the method as described above.

BRIEF DESCRIPTION OF THE DRAWINGS

The invention will be better understood on studying a few embodiments, which are described by way of completely nonlimiting example and illustrated by the appended drawings, in which.

DETAILED DESCRIPTION

The present invention is an alternative to the aforementioned methods and allows a morphable model of any type of subject or element to be created on the basis of the study of its morphology.

In the rest of the description, the described example elements will be human ears or human faces, but the invention may be applied to any other element whatsoever.

In particular, the present invention does not require texture information and therefore thus avoids the pose and illumination problems to which optical flow algorithms, such as SFM (structure from motion) or SFS (structure from shading) algorithms, are subject. In addition, the invention makes it possible to naturally adapt to three-dimensional or 3D data just like to 2.5D data. Lastly, the present invention allows semantic information to be preserved, or in other words the physical sense conveyed by a zone, a group of peaks or even a single peak to be preserved. Thus, in the example of a human face, the peaks composing the nose of the average shape will also compose the nose of any face of the model after deformation. This observation is also valid for substructures, such as in the present case: the end of the nose, the right and left nostrils or the ridge.

Figure 1:
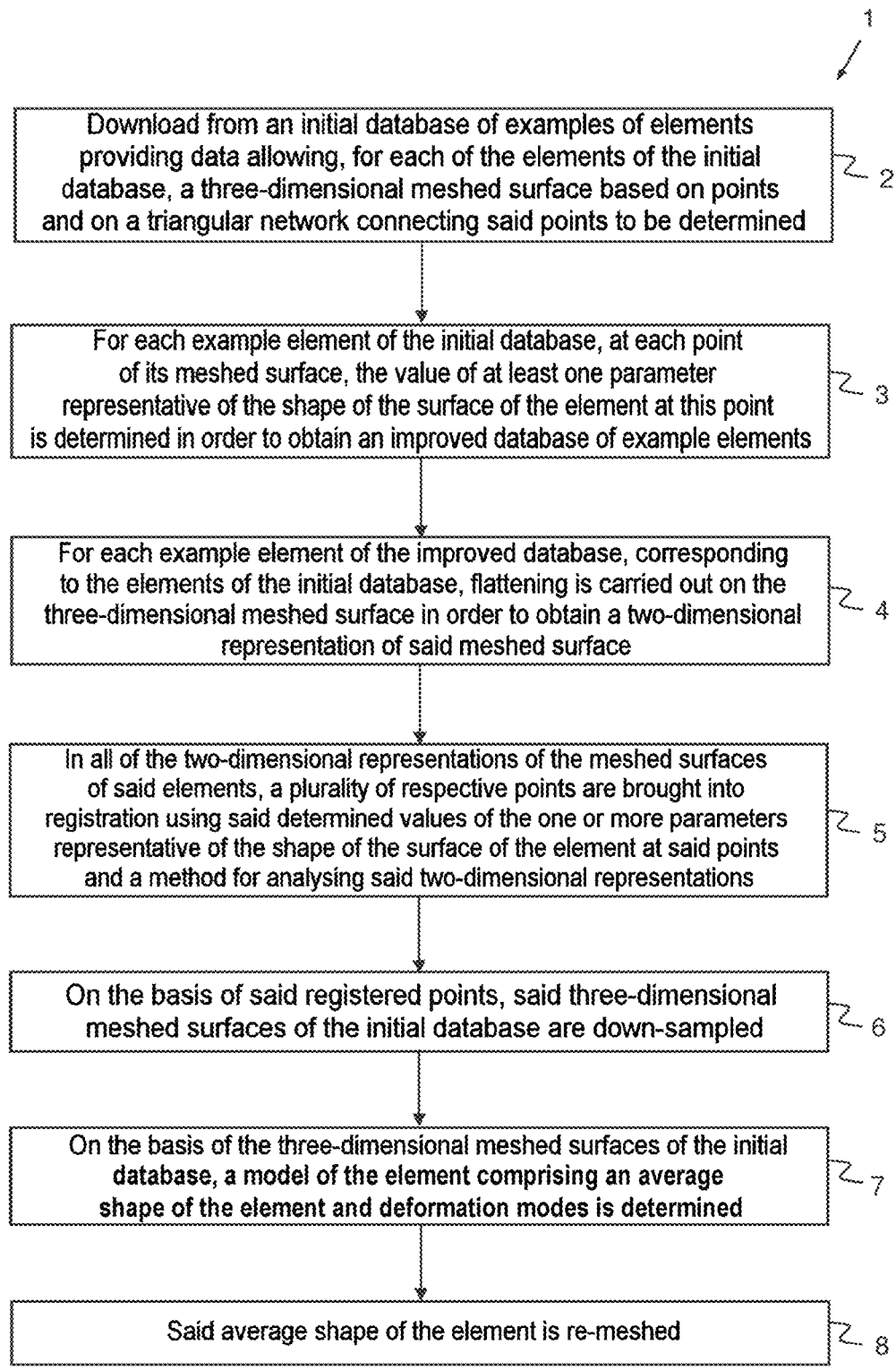
FIGS. 1 to 7 schematically illustrate a method according to one aspect of the invention, said method being applied to human ears.

FIG. 1 shows the main steps of the method according to one aspect of the invention.

In other words, FIG. 1 illustrates a method 1 for generating a three-dimensional morphable model of an element from an initial database of examples, which database is loaded 2 into the computational means implementing the method, of such elements providing data allowing, for each of the elements of the initial database, a three-dimensional meshed surface based on points and on a triangular network connecting said points to be determined, wherein:

for each example element of the initial database, at each point of its meshed surface, the value of at least one parameter representative of the shape of the surface of the element at this point is determined 3 (by measurement or computation) in order to obtain an improved database of example elements;

for each example element of the improved database, corresponding to the elements of the initial database, flattening or unwrapping is carried out 4 on the three-dimensional meshed surface in order to obtain a two-dimensional representation of said meshed surface;

in all of the two-dimensional representations of the meshed surfaces of said elements, a plurality of respective points are brought into registration 5 using said determined values of the one or more parameters representative of the shape of the surface of the element at said points and a method for analyzing said two-dimensional representations of the meshed surfaces;

on the basis of said registered points, said three-dimensional meshed surfaces of the initial database are down-sampled 6;

on the basis of the three-dimensional meshed surfaces of the initial database, a model of the element comprising an average shape of the element and deformation modes is determined 7; and said average shape of the element is re-meshed 8.

It is possible to down-sample each example element of the initial database.

Thus, when the available computational power is limited, it is possible to adapt the data accordingly.

As a variant, it is possible to down-sample each example element of the initial database except one of said examples, which is taken as reference.

Thus, it is possible to improve the efficiency of the following step of automatic registration without requiring notably more computational power.

Figure 2A:
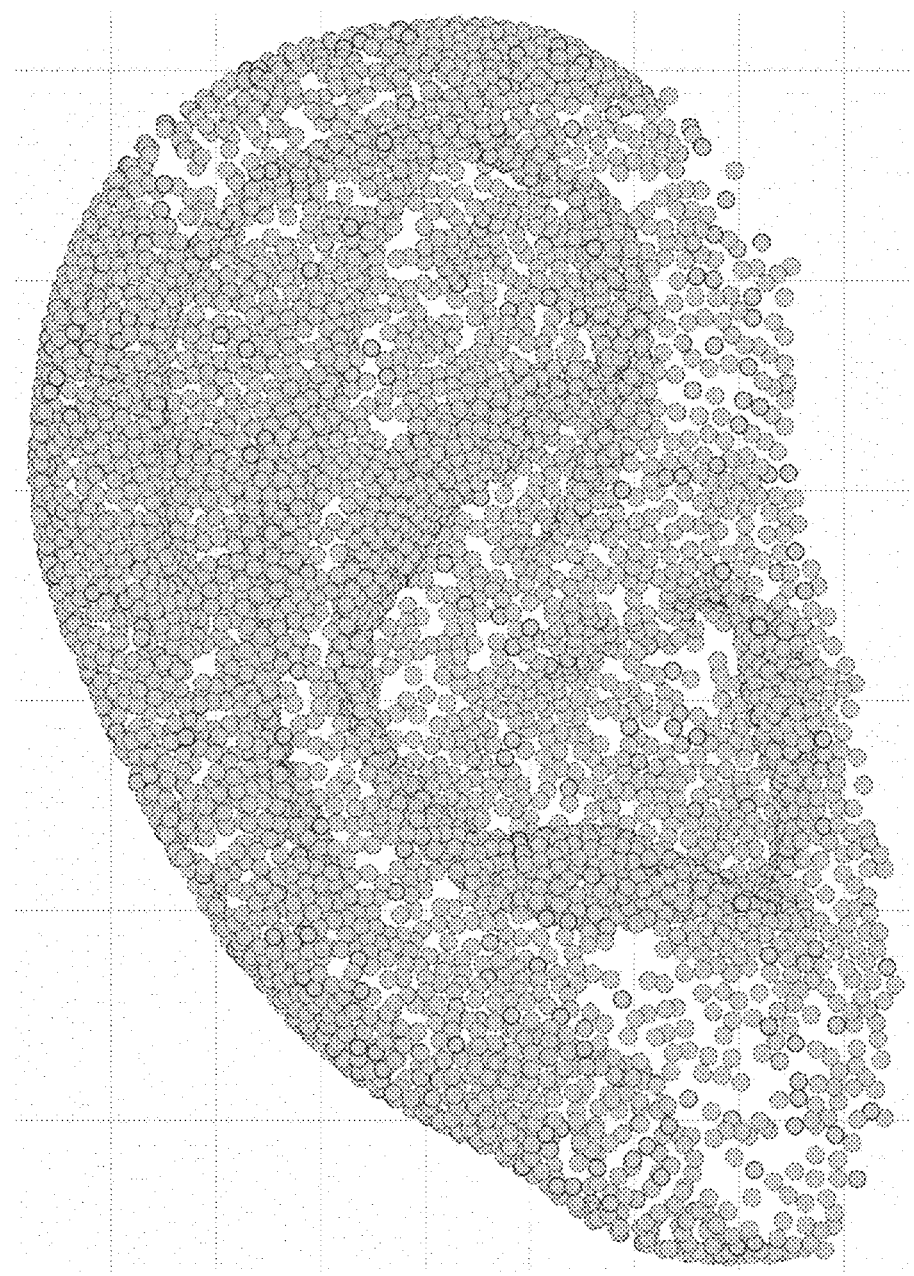
Figure 2B:
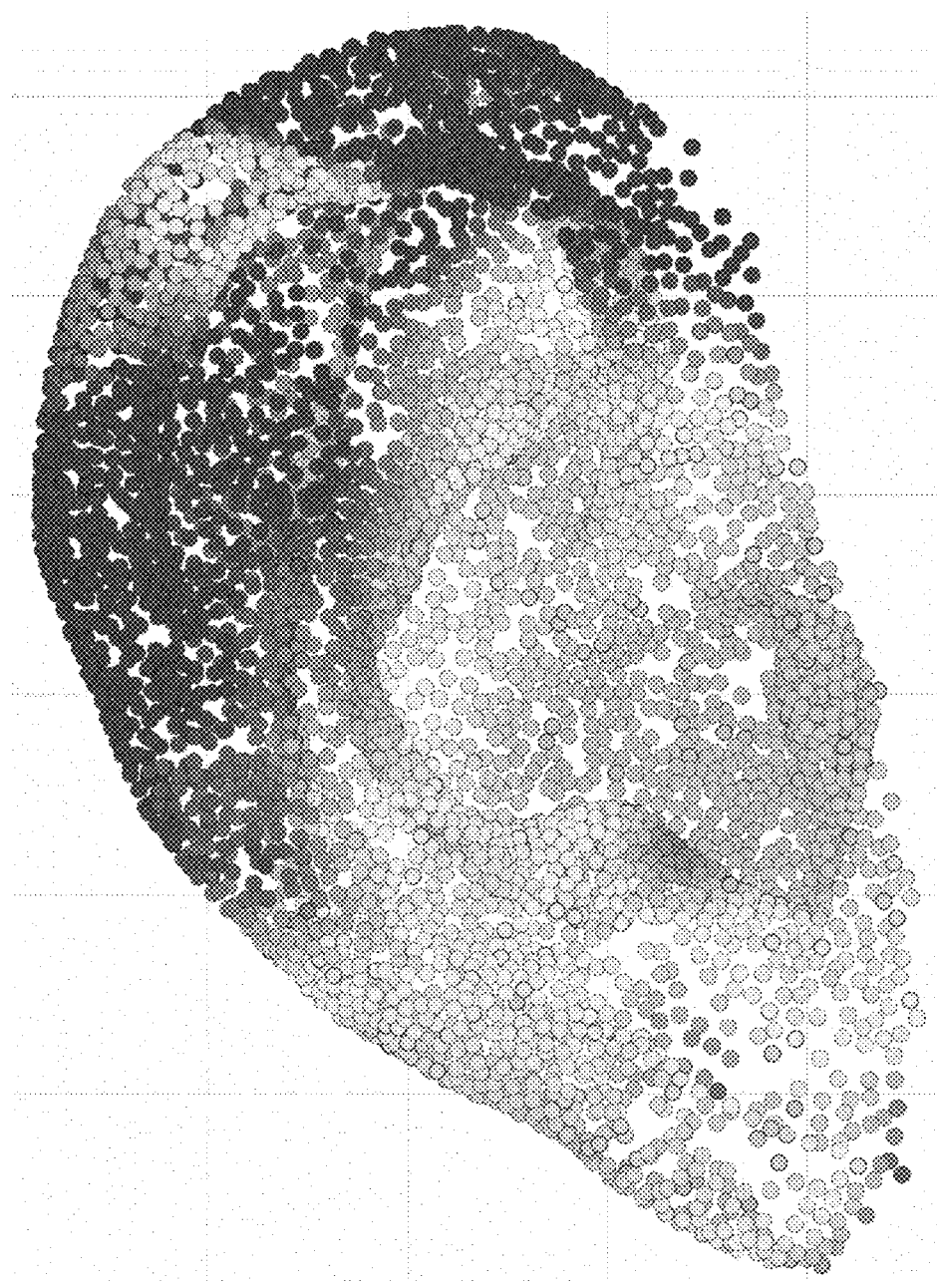

FIGS. 2a and 2b show an example of a model obtained using an ear database. FIG. 2a shows the un-meshed average ear, and FIG. 2b shows the same ear deformed in the third deformation mode. In the present case, it is a question of right ears.

More precisely, the models obtained by principal component analysis (PCA) take the form of an average and of deformation modes or of eigenvalue/eigenvector pairs hierarchized in order of importance, or of other terms in decreasing eigenvalue order. It is therefore possible to speak of the first deformation mode, of the second deformation mode, etc.

In the present invention, in the 3D universe, each deformation mode represents a set of types of movement undergone by the elements of the point cloud. It is possible to see these types of movement as the data of a direction and of a movement speed for each point. The datum of a multiplicational coefficient, which could be likened to a duration in the preceding analogy, allows the exact movement thereof to be computed.

FIG. 2a shows the average ear without deformation and the preceding figure is the same ear with deformations. In both cases, the gray level represents the movements of the points with respect to their position within the average ear. In FIG. 2a, seeing as there is no movement, the shade of gray is uniform.

In FIG. 2b, the third deformation mode has been used. The peaks with the highest gray levels are those that have moved most and vice versa.

The present model thus allows physical substructures of the ear that have a tendency to change in unison (or in contrast separately if a complementarity approach is employed) to be revealed.

The gray level of each point is associated with its deviation with respect to its position in the average shape (the higher the gray level, the larger the deviation).

Figure 3:
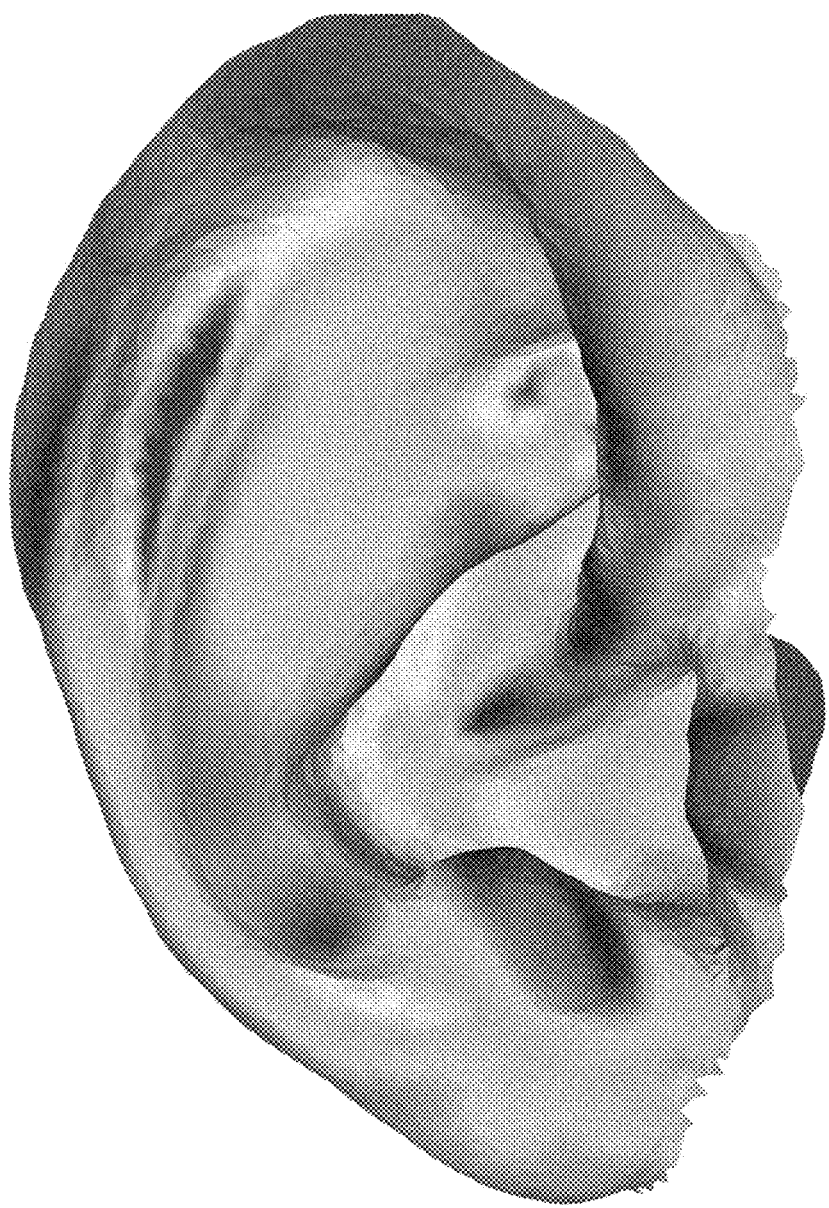
Figure 4A:
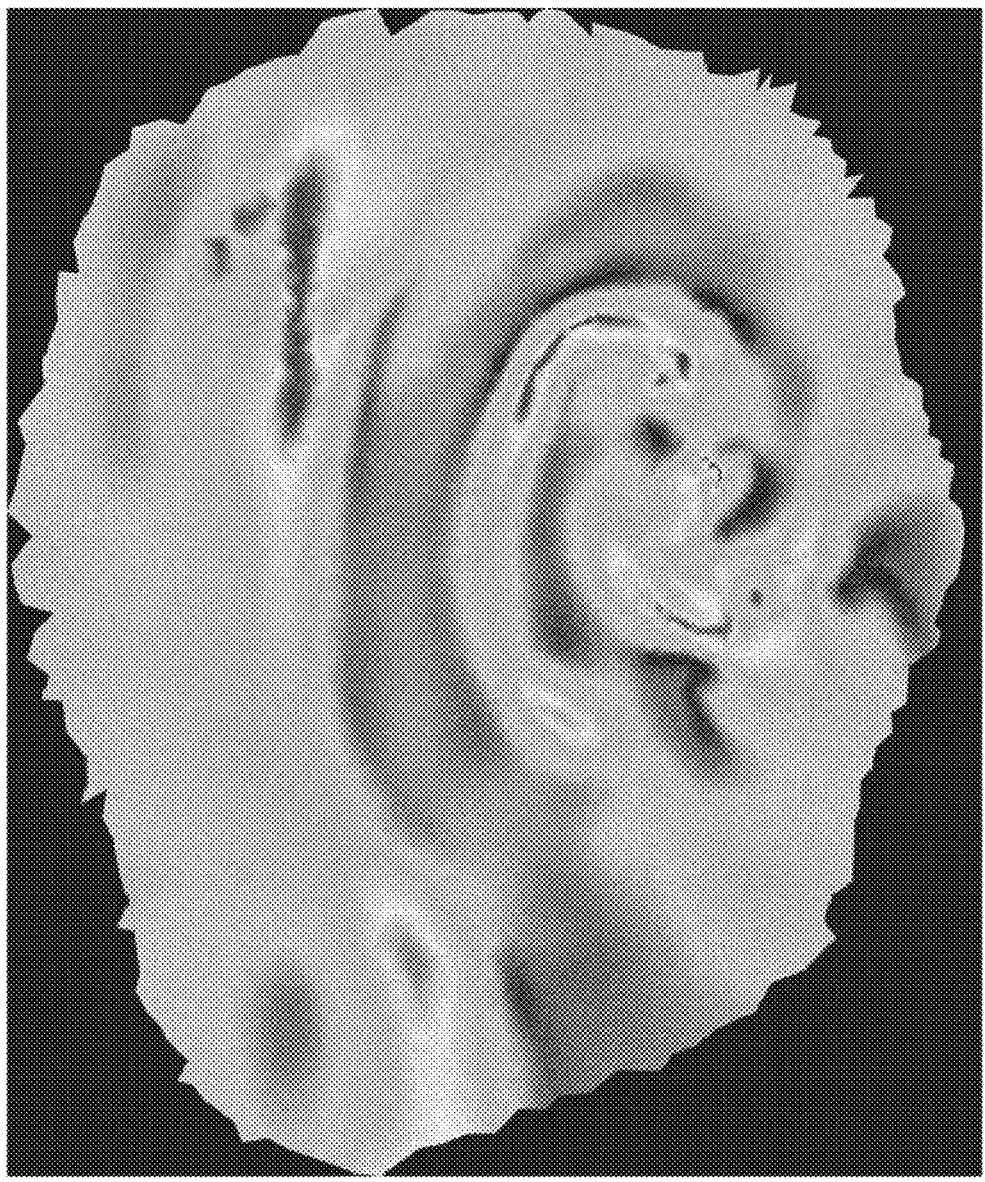
Figure 4B:
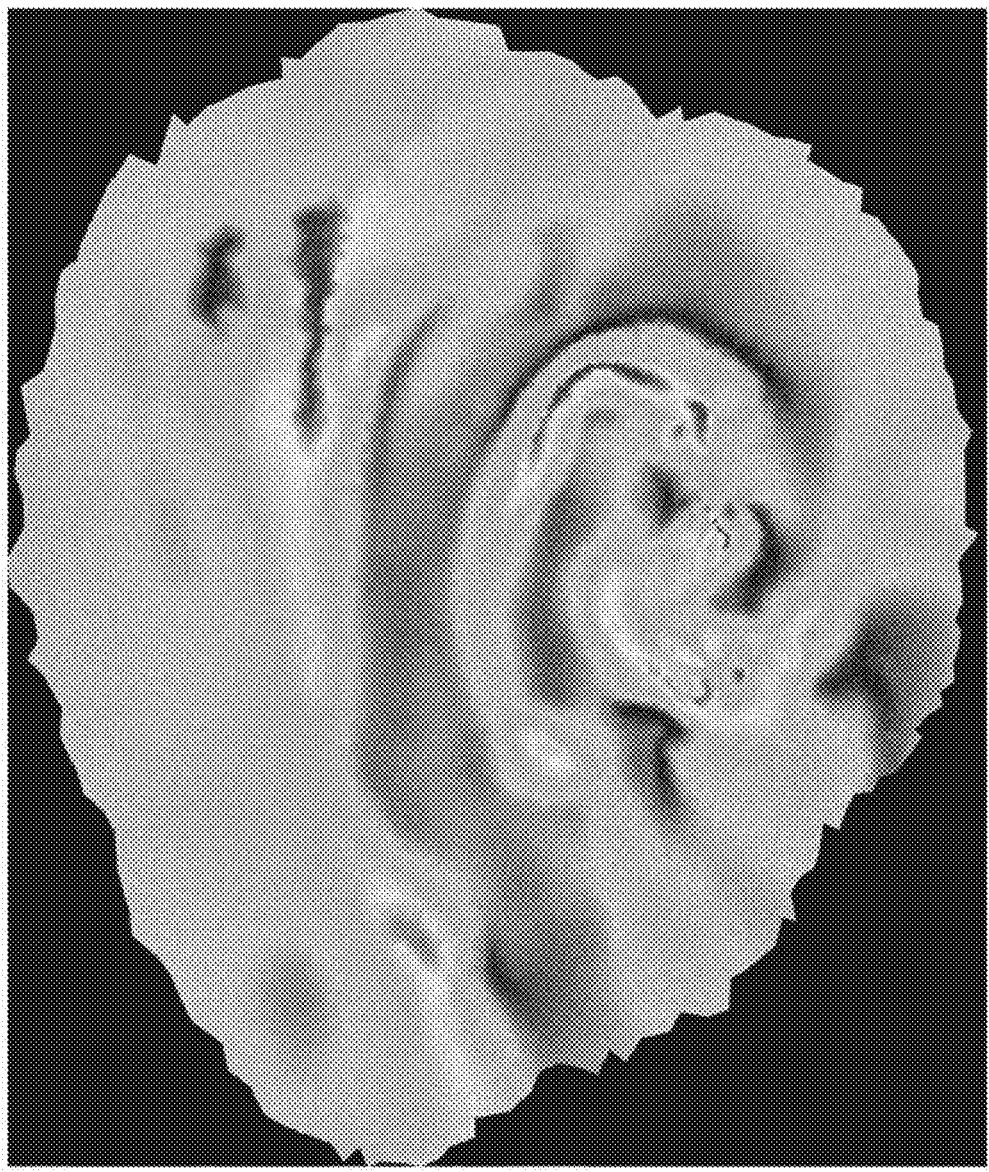

The method according to one aspect of the invention is implemented as follows:
1) A database of training examples is assumed to be available, each of the examples allowing, directly or after processing, a meshed surface to be reconstructed in $R^3$.
2) For each example:
local geometric characteristics of each point of each example are measured. The result of each measurement is associated with the point that served for its realization. This measurement may be of local curvature, as illustrated in FIG. 3, such as the minimum, maximum, Gaussian or average curvature at the point in question, of a more complex shape descriptor such as a surface patch histogram of index shape (SPHIS), or of an equivalent or a combination of the above. The 3D ear of FIG. 3 has gray levels that depend on the local average curvature–the higher the local average curvature, the darker the gray.

the surface is unwrapped, which thus allows a representation of each mesh taking the form of a 2D image (denoted im2D) to be obtained, as illustrated in FIGS. 4a and 4b (which respectively correspond to the left and right ear of the subject 9 after curvature computation and flattening) and a connected graph to be obtained (which graph is conventionally denoted Gc but is not shown). In FIGS. 4a and 4b, the gray levels are such that the higher the local average curvature, the darker the gray.

Figure 5:
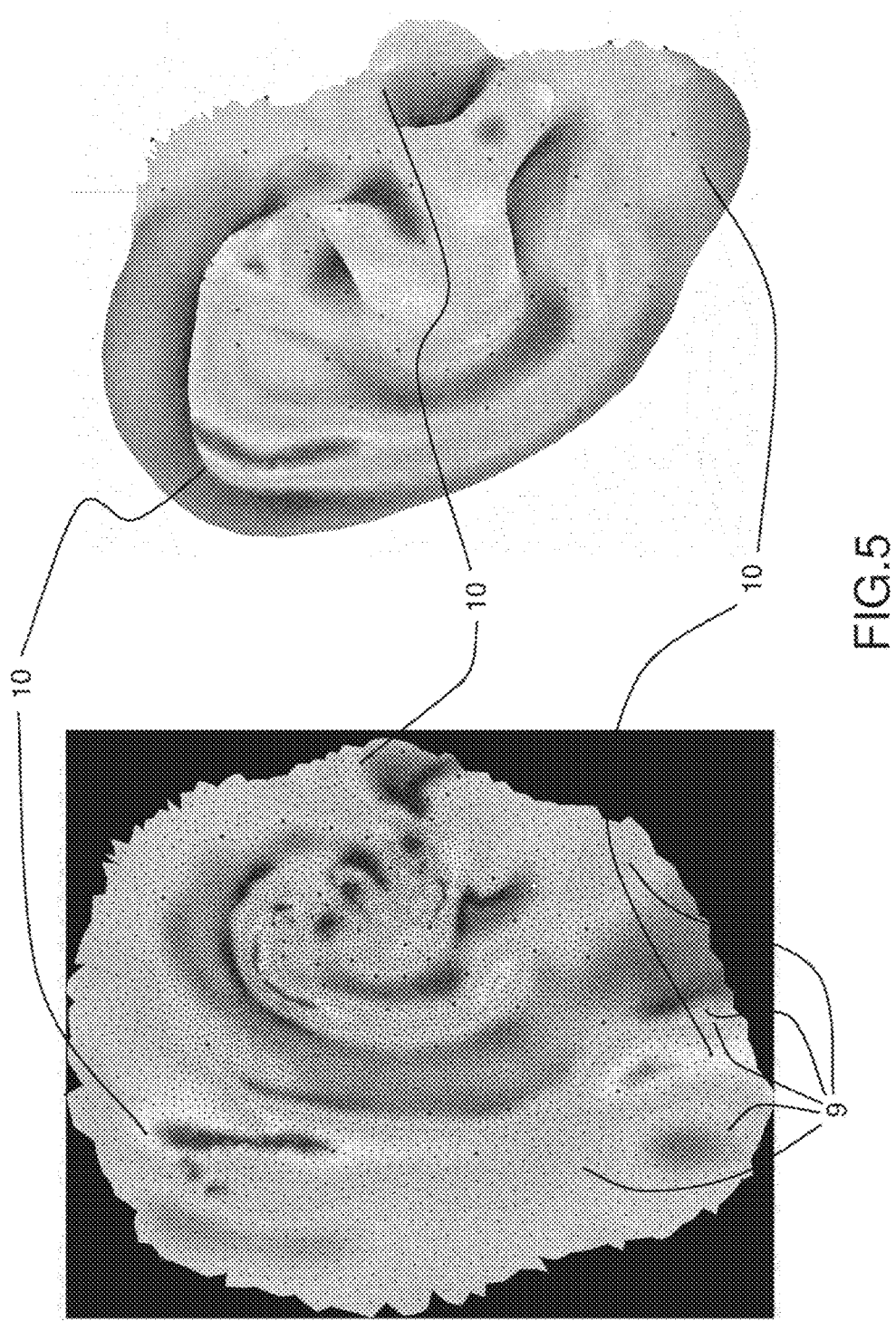

This unwrapping may be carried out in multiple ways, such as with ABF (angle-based flattening) algorithms, LSCM (least square conformal mapping) algorithms or derivatives thereof (ABF++ algorithms, HSLCM (hierarchical least square conformal mapping) algorithms, etc.).
3) Registration of a maximum of points is carried out on the basis of the 2D images using the characteristics measured in point 2) and analyzing methods related to 2D image processing, as illustrated in FIG. 5. FIG. 5 shows, to the left in 2D and to the right in 3D, the same ear after manual registration of 88 points on the isocurves 9, which are shown in the 2D image on the left. In FIG. 5, the gray levels are such that the higher the local average curvature, the darker the gray.
4) The points 10 retained during the registration are then used to down-sample the initial 3D meshes. The resulting point clouds are then used to form the actual model using conventional construction tools such as principal component analysis (PCA) or intermediate component analysis (ICA), etc.

A shape called the average shape and deformation modes are then obtained as illustrated in FIG. 2b.

5) The average shape is remeshed in order to allow a surface to be given to the model.

There follows an example embodiment of the method of the invention, relating to a 3D morphable ear model.

The database used consisted of ten examples freely accessible from the SYMARE database, SYMARE being the acronym of "Sydney-York Morphological And Recording of Ears".

In addition, all the left ears of these 10 pairs of ears were symmetrized with respect to the sagittal plane so as to create twenty right ears (the ten initial right ears and the ten right ears obtained by symmetrization of the ten left ears).

The set of indices of these right ears will be denoted I=[[1; 20]] and the index of the right ear taken as reference right ear will be denoted i=1.

For reasons of consistency, the meshes of the ears thus obtained were down-sampled to about 6900 peaks. This purely optional step was present in order to optimize the digital processing time and to facilitate the subsequent integration of any other training examples.

Lastly, the left ear of the first subject of the database was chosen as reference ear after right-ear symmetrization. In the rest of the document, all the notations indexed by ref naturally relate to this reference (in particular, iref=1).

Point 2) of the description of the invention was then carried out. Local average curvature was used as geometric characteristic and applied as texture to the 3D meshes, as illustrated in FIG. 3.

The unwrapping was carried out by virtue of an LSCM (least square conformal mapping) algorithm, as illustrated in FIGS. 4a and 4b.

As specified in point 3), other algorithms are employable. There are no particular pre-requisites. Registration of the peaks of the connected graphs required the following steps:
1) A step in which the 2D images were segmented into $N_C$=10 curvature levels that were uniformly distributed over the range of the values taken by the curvature measurements, as illustrated in FIG. 5.
2) A step in which $N_S^{manu}$=88 peaks of the reference connected graph were selected.

Figure 6:
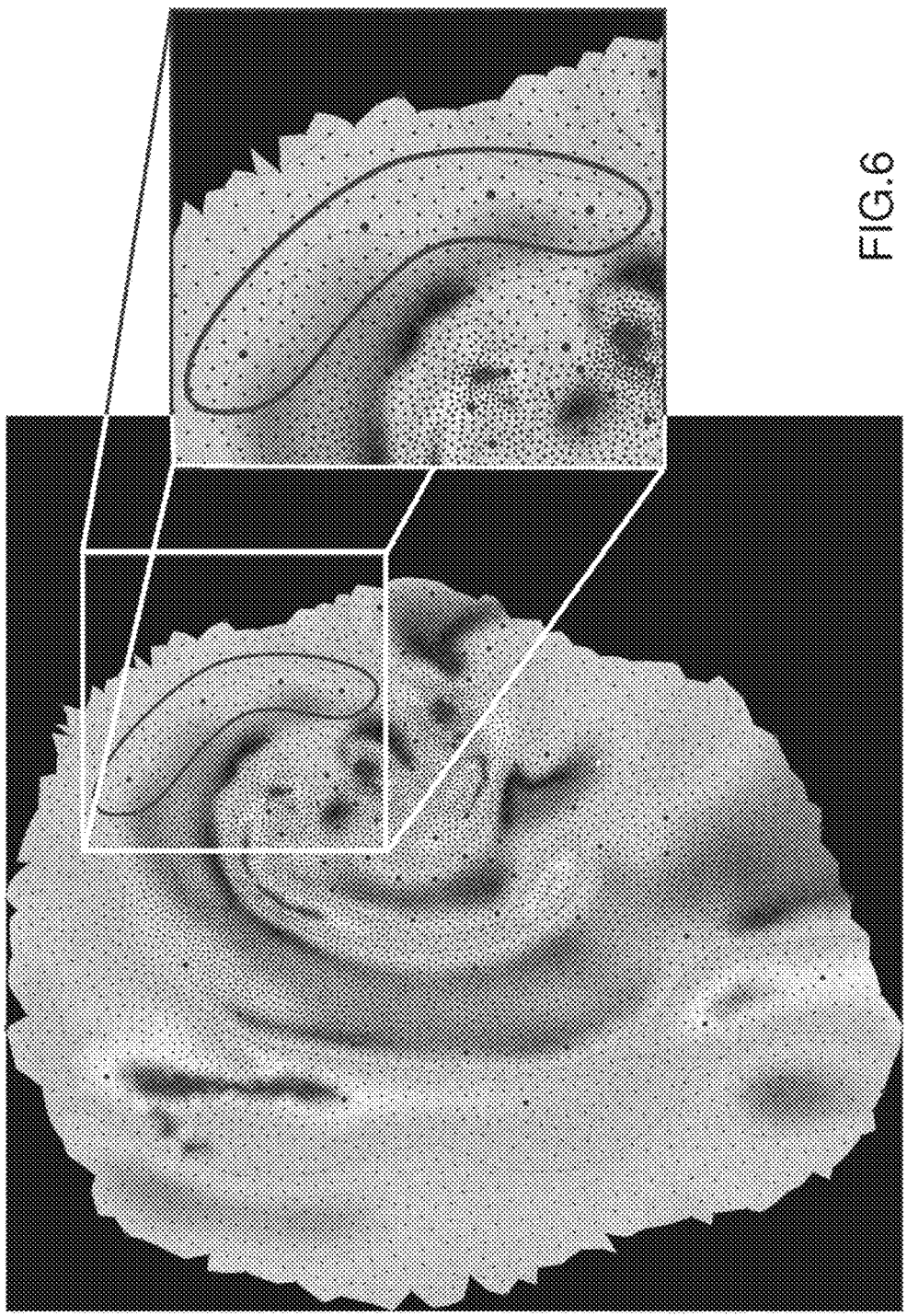

This selection was carried out on $n_C$ isocurvature lines, as illustrated in the example of FIG. 6, with $n_c \in [[1, N_c]]$, said lines themselves being chosen to ensure a uniform distribution of the peaks.
3) A step in which corresponding peaks were selected in each corresponding connected graph (not shown) $G_c^i$, $i \in I\{i_{ref}\}$.
4) A step in which a triangulation (in the present case, a Delaunay triangulation) was carried out on the $N_S^{manu}$ peaks issued from the connected graph $G_c^{iref}$ of the reference ear indexed $i_{ref}$ and in which the connectivity graph or connected graph that resulted therefrom was transferred to the other groups of peaks isolated beforehand.

This created a finite set of triangles, indexed $J \subset N$. In the present case, J=[[1,163]].

Figure 7:
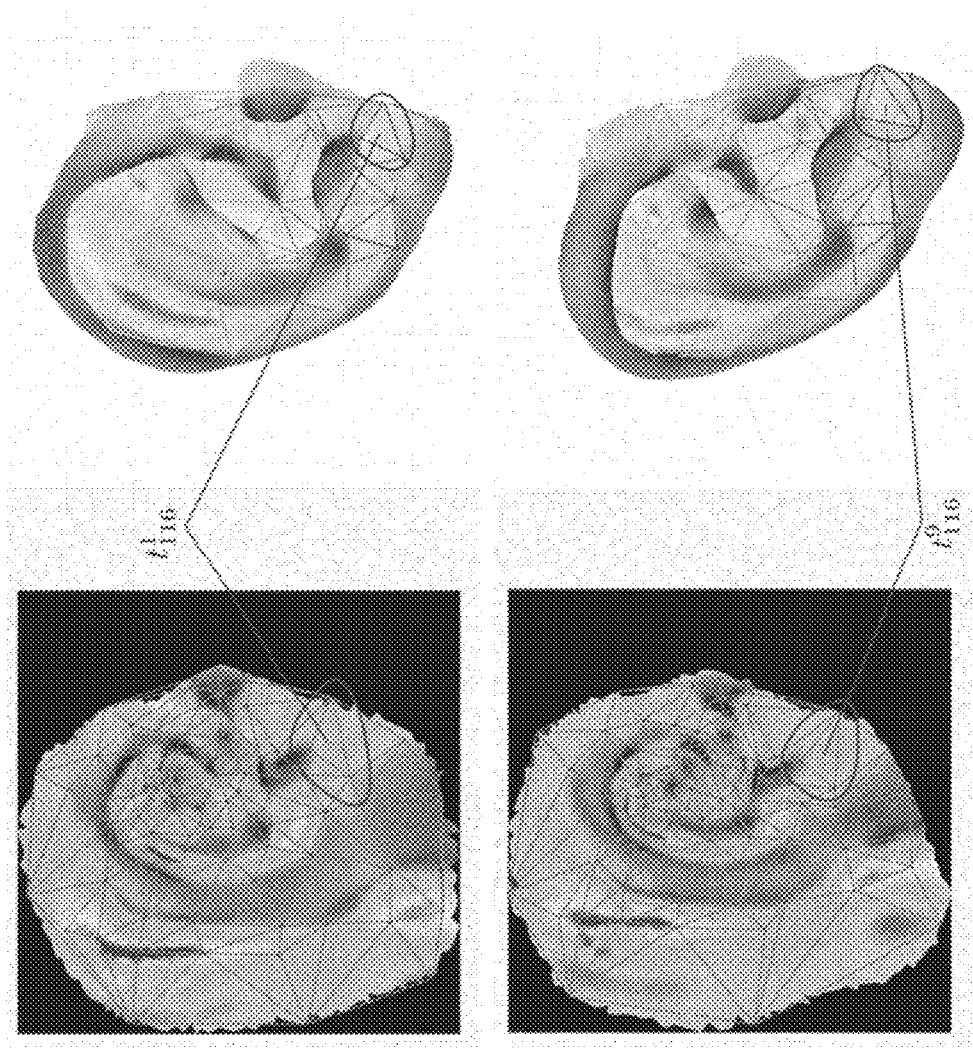

The set thus created for the $i^{th}$ ear, as illustrated in FIG. 7, was denoted $\overline{T}=\{t_j^i, j \in J\}$, $i \in I$. FIG. 7 shows the ear indexed 1 at the top and the ear indexed 9 at the bottom, unwrapped in 2D on the left and in 3D on the right, respectively. A triangulation of the $N_S^{manu}$ selected peaks was carried out on ear 1 and transferred to ear 9. By way of example, triangle number 116 of this triangulation is indicated for both of ears 1 and 9.
5) A step in which, for each $j \in J$, $T_j=\{t_j^i, i \in I\}$ was considered to be the set of the $j^{th}$ triangles. Each element $t_j^i$ j potentially contained peaks of the graph $G_c^i$, the centroid coordinates of which were computed in the coordinate system specific to the triangle $t_i^j$.

6) A step in which the set of peaks included in $t_j^{i_{ref}}$ was parsed and, for each thereof, in each other triangle $t_j^i \in T_j \setminus i \neq i_{ref}$, the peak closest in terms of centroid coordinates was sought. This created new registrations.

However, since it was necessary for a peak of a graph not to be associated with a plurality of peaks of another, conflicting registrations that were the least interesting from the point of view of centroid distance were deleted. Thus a set of automatic registrations was obtained from the elements of $T_j$, $j \in J$.

This was done for all $j \in J$ and, in the end, $N_s^{auto} \in \mathbb{N}$ automatic registrations were obtained for all the ears. In the present example, $N_s^{manu} + N_s^{auto} = 1460$ points.

Among the possible variants and improvements, the following may be listed:

- Use of other criteria for characterizing the local geometry rather than just curvature, and indeed conjoint use of a plurality thereof.
- Up-sampling of all the ears or of all the ears except the reference ear. This allows the efficiency of the automatic registration to be increased and, therefore, the final resolution of the model to be increased.

This additional step makes it possible to pass from 1460 points to 5076 points, to be placed facing the 6900 peaks in the initial meshes. For example, this up-sampling may use the centroids of the initial triangles.

The parameters $N_c$ and $N_s^{manu}$ may of course be set to other values.

The curvature levels may not be uniformly distributed over the available range but take into account the statistical distribution of the values of the curvatures.

The $N_s^{manu}$ points selected in registering step 2) may be selected automatically or semi-automatically, for example:

- gradual training of the selection process may be performed with the first ears, thus allowing preselection on the following ears.
- snake-based methods may be used to establish the detail of the transformations of an isoline of one image to the corresponding isoline of another image.

In another example embodiment, as follows, the method was applied to human faces.

The database of faces used in the present example consisted of examples 2, 5, 6 and 14 of the 3D database of faces "UWA face database" of the University of Western Australia, which is available at the following address: "http://staffhome.ecm.uwa.edu.au/~00053650/database-s.html".

As for the example described above applied to human ears, a mesh was chosen as reference. In the present case, that was subject number 2 of the database.

Figure 8:
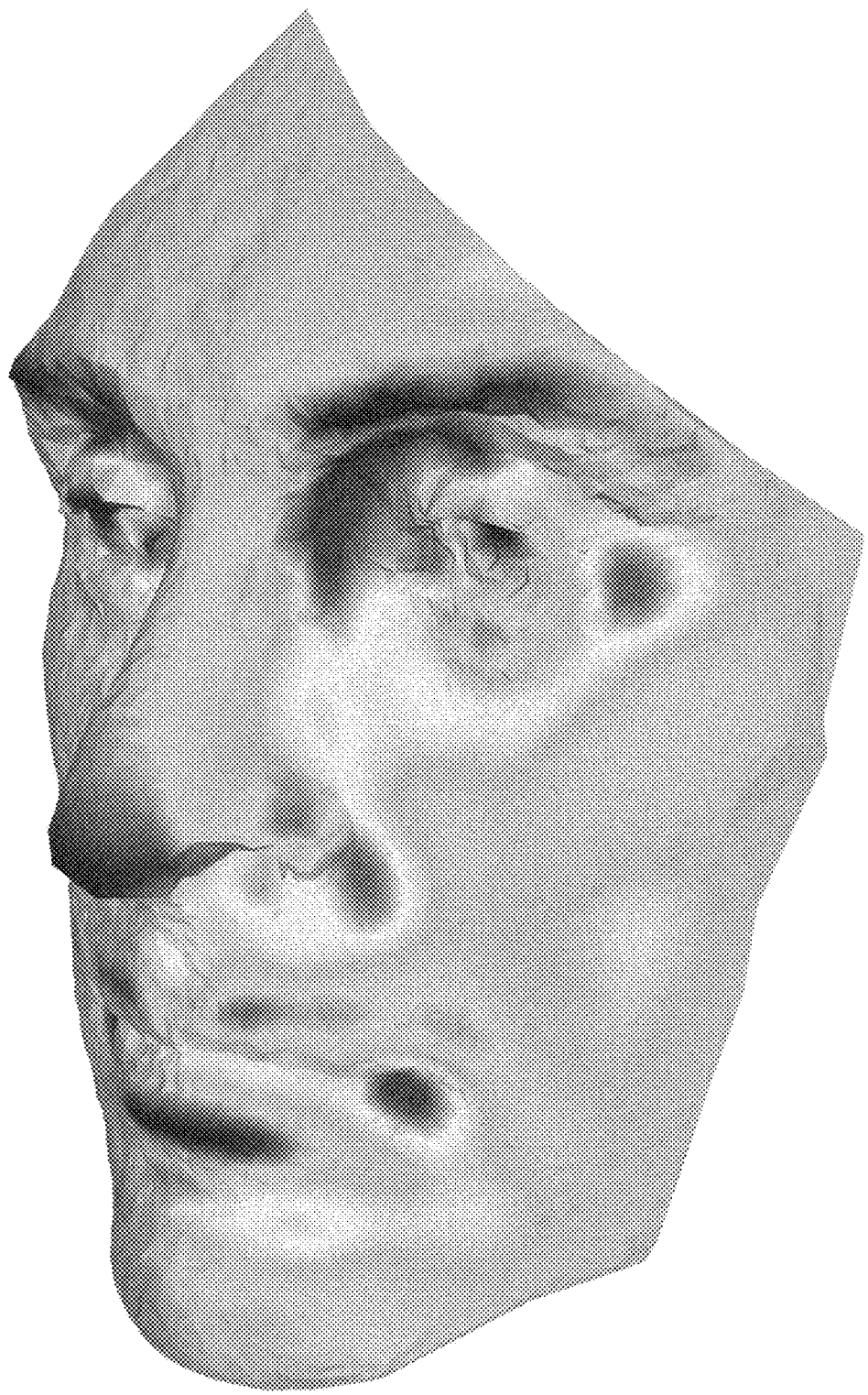
FIGS. 8 to 10 schematically illustrate a method according to one aspect of the invention, said method being applied to human faces.

Likewise, the local average curvature was also used as geometric characteristic and applied by way of texture to the 3D meshes, as illustrated in FIG. 8, in which the gray levels are representative of the local average curvature–the higher or darker the gray level, the higher the local average curvature.

In contrast, contrarily to the preceding case, the available meshes were not down-sampled. The number of initial peaks varied between 16655 and 25951.

Step 2 of the description of the invention was then carried out using the same methodology as for the described example based on ears.

Figure 9:
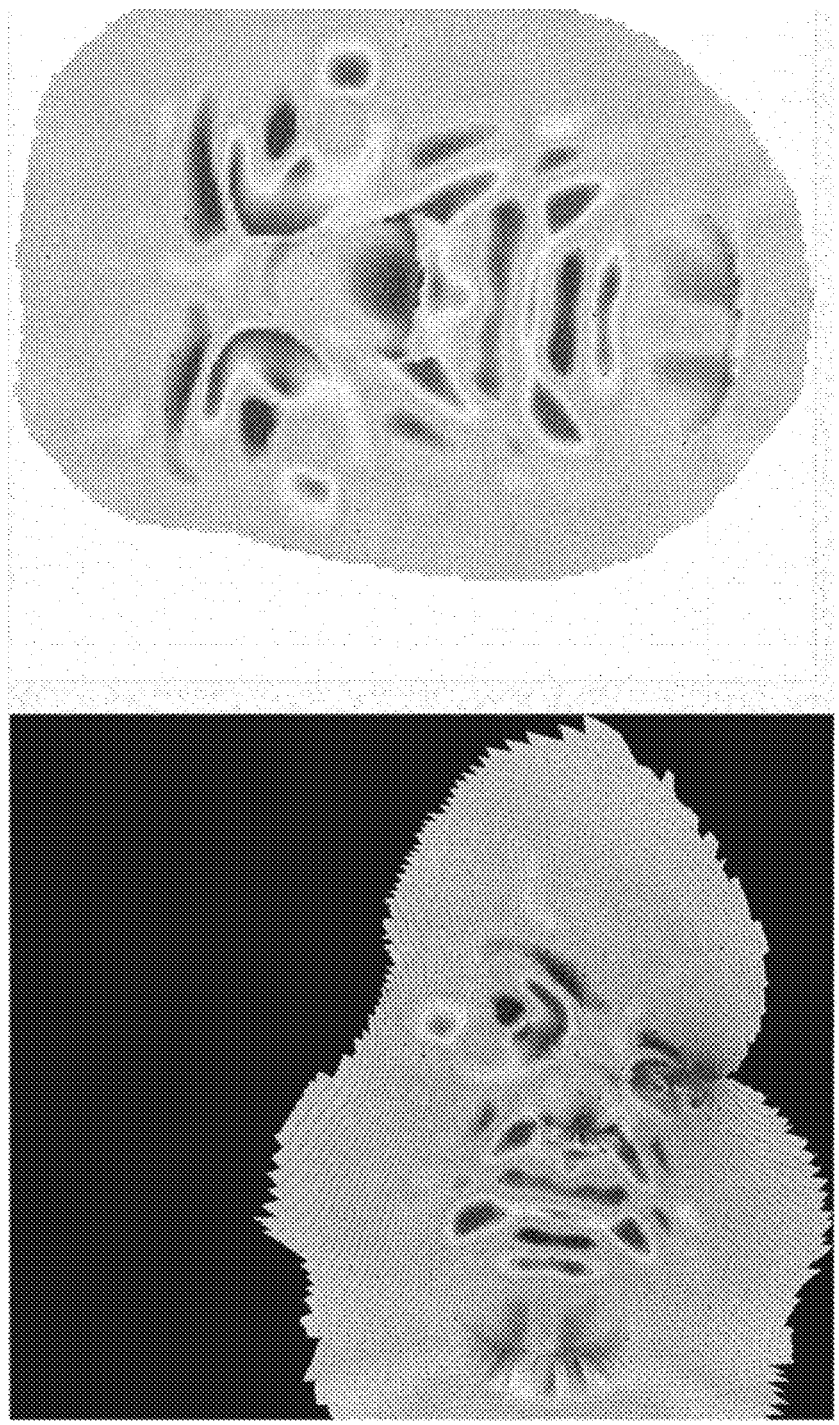

The only notable differences were the number of training examples (4 faces) and the number of manually annotated points ($N_s^{manu}=37$), as illustrated in FIG. 9 which shows an example of a 2D and 3D representation of a given face after manual registration of 37 points located on isocurves, similarly to FIG. 5 for the example of application to the ears.

Figure 10:
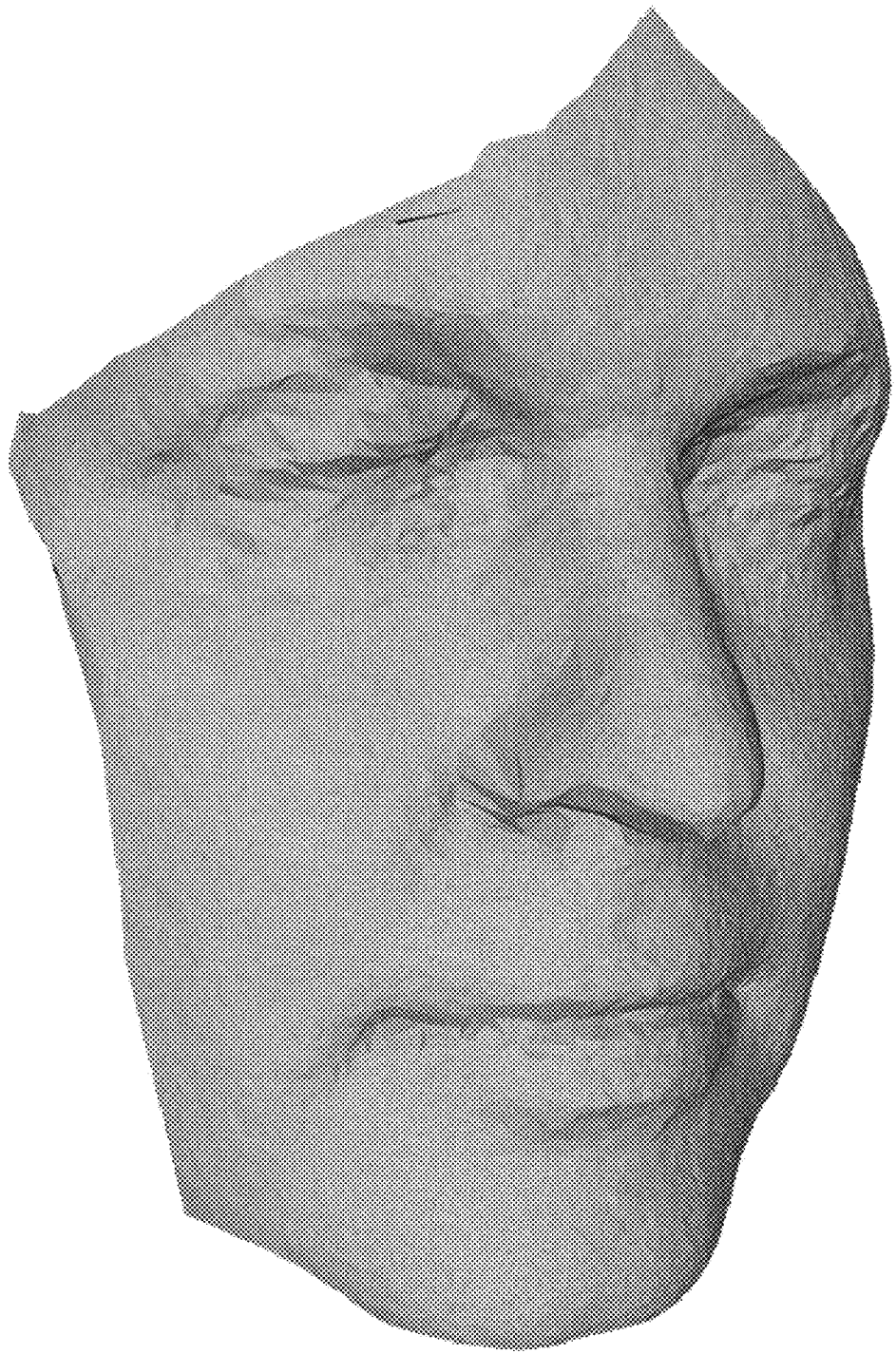

The obtained result was a morphable face model comprising 6846 peaks and forming an average face, as illustrated in FIG. 10 in gray level, accompanied by 3 deformation modes.

In the present application, an innovative way of constructing a morphable model has been described. This method has many advantages with respect to the prior art, and in particular:

- Potential application to any type of 3D shape, without loss of information.
- Preservation of the semantic aspect attached to the studied object, by virtue of the local character of the considered characteristics.
- Entirely automatable.
- Unconstrained with respect to the texture of the training examples and therefore to the illumination conditions during the acquisition of the data.
- The ability to incorporate 2D-image analyzing algorithms, which are more numerous and mature than those of the 3D world.

The steps of the method described above may be carried out by one or more programmable processors executing a computer program in order to execute the functions of the invention by performing operations on input data and generating output data.

A computer program may be written in any form of programming language, including compiled or interpreted languages, and the computer program may be deployed in any form, including as an autonomous program or as a subprogram, element or other unit suitable for use in a computational environment. A computer program may be deployed to be executed on one computer or on a plurality of computers at a single site or distributed over a plurality of sites and connected together by a communication network.

The preferred embodiment of the present invention has been described. Various modifications may be made without departing from the spirit and scope of the invention. Therefore, other implementations fall within the scope of the following claims.

The invention claimed is:

1. A method for generating a three-dimensional morphable model of an element from an initial database of examples of such elements providing data allowing, for each of the elements of the initial database, a three-dimensional meshed surface based on points and on a triangular network connecting said points to be determined, wherein:

for each example element of the initial database, at each point of its meshed surface, the value of at least one parameter representative of the shape of the surface of the element at this point is determined in order to obtain an improved database of example elements;

for each example element of the improved database, corresponding to the elements of the initial database, flattening is carried out on the three-dimensional meshed surface in order to obtain a two-dimensional representation of said meshed surface;

in all of the two-dimensional representations of the meshed surfaces of said elements, a plurality of respective points are brought into registration using said determined values of the one or more parameters representative of the shape of the surface of the element at said points and a method for analyzing said two-dimensional representations of the meshed surfaces;

on the basis of said registered points, said three-dimensional meshed surfaces of the initial database are down-sampled;

on the basis of the three-dimensional meshed surfaces of the initial database, a model of the element comprising an average shape of the element and deformation modes is determined; and said average shape of the element is re-meshed.

2. The method as claimed in claim 1, wherein said one or more parameters representative of the shape of the surface of the element at a point of the meshed surface of an example of the initial database comprise a local curvature at said point and/or a shape descriptor at said point.

3. The method as claimed in claim 2, wherein said local curvature comprises a minimum curvature and/or a maximum curvature and/or a Gaussian curvature and/or an average curvature.

4. The method as claimed in claim 2, wherein the shape descriptor comprises a surface patch histogram of index shape.

5. The method as claimed in claim 1, wherein said flattening uses an ABF, LSCM, ABF++, or HLSCM method.

6. The method as claimed in claim 1, wherein said registration uses a segmentation of the two-dimensional representations into $N_c$ curvature levels that are uniformly distributed over the range of the values taken by the values of the one or more parameters representative of the shape of the surface of the element.

7. The method as claimed in claim 1, wherein said registration uses a segmentation of the two-dimensional representations into $N_c$ curvature levels that takes into account the statistical distribution of the values taken by the values of the one or more parameters representative of the shape of the surface of the element.

8. The method as claimed in claim 1, wherein said registration uses a number $k_S^{manu}$ of manually registered points.

9. The method as claimed in claim 8, the method being semi-automatic, wherein, during said registration, the number $k_S^{manu}$ of points registered manually for the current element decreases with the number of processed elements.

10. The method as claimed in claim 8, the method being automatic and based on snakes, wherein the number $N_S^{manu}$ of points registered manually is zero.

11. The method as claimed in claim 1, wherein said element is a right ear and/or a left ear and/or the head, and/or the torso of an individual.

12. A system for generating a three-dimensional morphable model of an element from an initial database of examples of such elements providing data allowing, for each of the elements of the initial database, a three-dimensional meshed surface based on points and on a triangular network connecting said points to be determined, comprising a computer configured to implement the method according to claim 1.

* * * * *